3,287,388
PROCESS FOR PREPARING ARYLFLUOROFORMATES AND ARYLFLUOROTHIOLFORMATES
Karl O. Christe and Attila E. Pavlath, Berkeley, Calif., assignors to Stauffer Chemical Company, New York, N.Y., a corporation of Delaware
No Drawing. Filed Aug. 7, 1963, Ser. No. 300,638
1 Claim. (Cl. 260—455)

This invention relates to a new and novel method for preparing fluorine containing aromatic compounds. In particular, it refers to a process for preparing the classes of fluorinated aromatic compounds, aromatic fluoroformates and aromatic fluorothiolformates by chlorinefluorine halogen exchange. This method can be used to prepare both the monocyclic and polycyclic arylfluoroformates or arylfluorothiolformates. They can be either mono- or poly-fluoroformates or fluorothiolformates. The aromatic nucleus can be either unsubstituted or substituted with such groups as halogen, alkyl, haloalkyl, alkoxy, haloalkoxy and the like.

The arylchloroformates, which are well known, have been described frequently in the literature. Especially the preparation and chemical properties of phenylchloroformate have been studied and described in the literature. The novel properties of the arylfluoroformates permits their use in a variety of applications. For example, they can be used as intermediates in preparing the corresponding fluoroaromatic compounds, as shown in our copending application Serial No. 300,666, filed on even date herewith and now abandoned; as intermediates for organic compounds useful in agricultural chemicals, pharmaceuticals, as plasticizers, and in resins.

The only reported preparation of phenylfluoroformate was by Emeleus and Wood, J. Chem. Soc., 1948, 2183–8. The preparation was described using carbonyl fluoride with phenol in an autoclave. The yield of phenylfluoroformate was not very high because of excessive diphenylcarbonate formation in the procedure used.

A general object of the present invention is to provide a new process for preparing arylfluoroformates and arylfluorothiolformates.

A more specific object is provision of a process for preparing such arylfluoroformates and arylfluorothiolformates by a halogen exchange reaction which avoids the use of pressure equipment and decreases the yield of diarylcarbonate and diaryldithiolcarbonate formation.

The invention can be carried out by contacting the corresponding arylchloroformate or arylchlorothiolformate of the desired arylfluoroformate or arylfluorothiolformate with an inorganic fluoride of an element having an atomic number from 11 to 83 inclusive, or hydrofluoric acid, and isolating the arylfluoroformate or arylfluorothiolformate formed.

The inorganic fluoride which serves as the source of fluorine can be the fluoride of any of those elements in groups I to VIII inclusive of the periodic table which have atomic numbers 1 or from 11 to 83 inclusive.

The ratio of arylchloroformate or arylchlorothiolformate and inorganic fluoride is not critical. However, it is desirable to use the two reactants in such a ratio that there is present in the reaction mixture at least one atom of fluorine per atom of chlorine. Normally, the reactants are used in such a ratio that there is an excess of inorganic fluoride.

The reaction produces a mixture of products. The desired products may be purified in the usual manner. Either solvent extraction or distillation can easily be applied to the work up of the reaction mixture.

The reaction between arylchloroformates or arylchlorothiolformates and the inorganic fluoride to give arylfluoroformates or arylfluorothiolformate should be carried out at a temperature of at least 20° C. and preferably above 100° C. At lower temperatures the reaction proceeds very slowly, but at a slightly elevated temperature the completion of the reaction is enhanced. The temperature can be much higher depending on the nature of the arylchloroformate or arylchlorothiolformate and the boiling point of the solvent, if one is used. The preferred range is from about 50° to about 250° C.

The reaction can be carried out with or without a solvent. Either the arylchloroformate or arylchlorothiolformate may be used alone, or where the reaction may be enhanced by the presence of an inert solvent, for example sodium fluoride in acetonitrile, a solvent may be used.

The reaction can be carried out at atmospheric pressure under substantially anhydrous conditions in conventional glass laboratory equipment. The reactants are brought into intimate contact with stirring and heated if necessary. Normally the reaction can be completed satisfactorily in at least 2 hours, and preferably from 3 to 5 hours. Longer reaction times can be used and are sometimes necessary when the arylchloroformate or arylchlorothiolformate offers special resistance to fluorination by the fluoride being used.

A convenient procedure for work up of the crude reaction product, if no solvent is used, is to extract the organic product with methylene chloride. Any other suitable inert solvent that can be easily removed may be used instead. After removal of the low boiling extract solvent, the remaining organic material can be easily distilled in vacuo. If a solvent were used in the reaction the crude reaction product could be filtered first, then the solvent removed by vacuum distillation. The purification of the desired organic product can be done by vacuum distillation in the usual manner.

The following examples are illustrative of the invention.

EXAMPLE I

A mixture of 400 g. (2.5 moles) of phenylchloroformate and 110 g. (1.4 moles) of potassium bifluoride was placed in a 500 ml. 4-neck flask fitted with a stirrer, thermometer, addition port and reflux condenser with calcium chloride drying tube. No solvent was used in this example. The mixture was stirred and electrically heated to 100° C. for 3 hours. At the end of this time the entire mixture was extracted with methylene chloride. The methylene chloride was removed on a rotating evaporator and the remaining organic material, impure phenylfluoroformate, was fractionally distilled in vacuo.

The phenylfluoroformate distilled at a boiling point of 47.1° C. at 7 mm. Hg (153° C. at 760 mm. Hg). Other physical properties: density 1.201 at 23.8° C., refractive index 1.4642 at 26.5° C. It was a colorless liquid which exhibited lachrymatory effects.

*Analysis.*—Theory: C, 60.1%; H, 3.57%; F, 13.6%. Found: C, 61.03%; H, 4.2%; F, 13.6%.

$F^{19}$ Nuclear Magnetic Resonance displayed a lone singlet at +16.5 p.p.m. ($CFCl_3$ as internal standard). We found this absorption characteristic of the fluoroformate grouping. Infrared analysis further supported the expected structure for phenylfluoroformate, showing strong stretching vibrations for the

at about 5.43μ and

at about 8.7μ.

EXAMPLE II

Using the same procedure of Example I, 80 g. (0.47 mole) of phenylchlorothiolformate and 42 g. (1 mol) of sodium fluoride were mixed in 250 ml. of acetonitrile. The mixture was stirred and refluxed for 12 hours. At the end of this time the mixture was worked up in the usual manner. A conversion of phenylchlorothiolformate of 95% and a yield of phenylfluorothiolformate of 100% was observed.

The phenylthiolformate was purified by fractional distillation in vacuo. It had a boiling point of 73° C. at 9 mm. Hg. Other physical properties: density 1.223 at 24° C. and refractive index 1.5273 at 24° C. Infrared analysis further confirms the expected structure for phenylfluorothiolformate.

*Analysis.*—Theory: C, 53.85%; H, 3.22%; S, 20.51%. Found: C, 53.59%; H, 3.39%; F, 20.42%.

The invention also can be applied to arylpolychloroformates and polychlorothiolformates. While this invention has been illustrated through the use of certain specific inorganic fluorides, it comprises broadly the process of preparing arylfluoroformates and arylfluorothiolformates by reacting the corresponding arylchloroformate or arylchlorothiolformate with an inorganic fluoride of an element having an atomic number from 11 to 83 inclusive, or, in place thereof, hydrogen fluoride. The reaction can be carried out with or without a solvent. Thus, in addition to the example, there can be used hydrogen fluoride, potassium fluoride, sodium fluoride, arsenic trifluoride, ammonium fluoride, ammonium bifluoride, and the like. Some acceptable solvents, which may be used in combination with the inorganic fluorides, are acetonitrile, dimethyl sulfoxide, and the like.

Various changes and modifications may be made in the process described herein as will be apparent to those skilled in the chemical arts. It is accordingly intended that the present invention shall only be limited by the scope of the appended claim.

We claim:

A process for producing substituted aromatic compounds selected from the group consisting of phenyl and naphthyl compounds having at least one substituent selected from the group consisting of fluoroformyl (—OCOF) and fluorothiolformyl (—SCOF), comprising contacting at a temperature range of about 20° C. to about 250° C. a substituted phenyl or naphthyl compound having bonded directly to an aromatic carbon atom at least one substituent selected from the group consisting of chloroformyl (—OCOCl) and chlorothiolformyl (—SCOCl), with an inorganic fluoride selected from the group consisting of sodium fluoride, sodium bifluoride, potassium fluoride and potassium bifluoride, and isolating the resulting fluorine containing compound.

References Cited by the Examiner

UNITED STATES PATENTS

| | | |
|---|---|---|
| 2,438,599 | 3/1938 | Blake. |
| 3,213,062 | 10/1965 | Ellingboe et al. __ 260—463 X |
| 3,219,680 | 11/1965 | Olah _____ 260—455 |

FOREIGN PATENTS

| | | |
|---|---|---|
| 480,105 | 2/1938 | Great Britain. |

OTHER REFERENCES

Ray, Nature (London), 1933, vol. 132, p. 173.

CHARLES B. PARKER, *Primary Examiner.*

DALE R. MAHANAND, DONALD M. PAPUGA, *Assistant Examiners.*